US010812363B2

(12) United States Patent
Romeo et al.

(10) Patent No.: US 10,812,363 B2
(45) Date of Patent: Oct. 20, 2020

(54) DIGITAL SIGNAL PROCESSING NOISE FILTER TO INCREASE TEST SIGNAL RELIABILITY

(71) Applicant: Microsoft Technology Licensing, LLC, Redmond, WA (US)

(72) Inventors: Joseph Romeo, Seattle, WA (US); Vyjeyanthi Murthy, Redmond, WA (US); Shruti Ramesh, Seattle, WA (US); Anthony Howe, Kirkland, WA (US); Ashutosh Dhiman, Redmond, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 159 days.

(21) Appl. No.: 15/989,407

(22) Filed: May 25, 2018

(65) Prior Publication Data
US 2019/0363970 A1    Nov. 28, 2019

(51) Int. Cl.
*G06F 13/00*    (2006.01)
*H04L 12/26*    (2006.01)
(Continued)

(52) U.S. Cl.
CPC .......... *H04L 43/50* (2013.01); *G06F 9/45558* (2013.01); *G06F 11/3672* (2013.01);
(Continued)

(58) Field of Classification Search
CPC ............. G06F 9/45558; G06F 11/3672; G06F 2009/45595; G06F 2009/45591; H04L 43/06; H04L 43/50
(Continued)

(56) References Cited

U.S. PATENT DOCUMENTS 9,886,294 B2 * 2/2018 Holler ................. G06F 9/45558
9,898,393 B2 * 2/2018 Moorthi ................ G06F 11/368
(Continued)

OTHER PUBLICATIONS

"Azure/acs-engine", Retrieved from: https://github.com/Azure/acs-engine/tree/master/test/acs-engine-test/promote, Retrieved Date: Jan. 2, 2018, 1 page.

*Primary Examiner* — Kenneth R Coulter
(74) *Attorney, Agent, or Firm* — Buckley, Maschoff & Talwalkar LLC

(57) ABSTRACT

Some embodiments are associated with a data center cloud computing environment executing a plurality of virtual machines. A virtual machine data store may contain information about the plurality of virtual machines associated with the cloud computing environment. A virtual machine test platform may access the information in the virtual machine data store and periodically initiate a network test for each of the plurality of virtual machines based on the information in the virtual machine data store. The virtual machine test platform may then receive network test result signals from the virtual machines in response to the executed network tests and apply, for each virtual machine, a digital signal processing noise filter to successive network test result signals from that virtual machine. An output of the digital signal processing noise filters may then be transmitted from the virtual machine test platform.

20 Claims, 11 Drawing Sheets

(51) Int. Cl.
*G06F 9/455* (2018.01)
*G06F 11/36* (2006.01)

(52) U.S. Cl.
CPC .... *H04L 43/06* (2013.01); *G06F 2009/45591* (2013.01); *G06F 2009/45595* (2013.01)

(58) Field of Classification Search
USPC .................................................. 709/224, 223
See application file for complete search history.

(56) References Cited

U.S. PATENT DOCUMENTS

| | | | |
|---|---|---|---|
| 10,083,027 B2* | 9/2018 | Moorthi | G06F 8/71 |
| 10,216,377 B2* | 2/2019 | Ozcan | G06F 3/0484 |
| 10,284,584 B2* | 5/2019 | Hu | G06F 21/552 |
| 10,474,559 B2* | 11/2019 | Moorthi | G06F 11/368 |
| 2003/0004697 A1* | 1/2003 | Ferris | G06F 30/33 |
| | | | 703/13 |
| 2013/0152047 A1* | 6/2013 | Moorthi | G06F 11/3664 |
| | | | 717/124 |
| 2014/0282400 A1* | 9/2014 | Moorthi | G06F 8/71 |
| | | | 717/122 |
| 2016/0085567 A1* | 3/2016 | Holler | G05B 19/41885 |
| | | | 718/1 |
| 2016/0117246 A1* | 4/2016 | Maurice | G06F 12/08 |
| | | | 711/130 |
| 2017/0244731 A1* | 8/2017 | Hu | G06F 21/552 |
| 2017/0277374 A1* | 9/2017 | Ozcan | G06F 3/0484 |
| 2018/0196731 A1* | 7/2018 | Moorthi | G06F 8/71 |

* cited by examiner

| VIRTUAL MACHINE IDENTIFIER 1002 | LAST THREE TEST RESULT SIGNALS 1004 | DSP TYPE 1006 | DSP OUTPUT 1008 | INCLUDE IN TROUBLESHOOTING REPORT? 1010 |
|---|---|---|---|---|
| VM_1001 | FAIL, PASS, FAIL | 3 STRIKES | PASS | NO |
| VM_1002 | FAIL, FAIL, FAIL | 3 STRIKES | FAIL | YES |
| VM_1003 | PASS, PASS, PASS | FIR | PASS | NO |
| VM_1004 | PASS, PASS, PASS | IIR | PASS | NO |

DIGITAL SIGNAL PROCESSING NOISE FILTER TO INCREASE TEST SIGNAL RELIABILITY

BACKGROUND

Cloud-based data centers may be employed by an enterprise in a variety of settings for running service applications and maintaining data for business and operational functions. For example, a data center within a networked system may support operation of a variety of differing service applications (e.g., web applications, email services, and search engine services). These networked systems typically include a large number of computing nodes distributed throughout one or more data centers, in which each node is associated with a physical machine. For example, FIG. 1 illustrates a system 100 having a number of computing nodes 110 (nodes 1 through N). Each computing node 110 may execute one or more Virtual Machines ("VM"), such as virtual machines A through D illustrated in FIG. 1. A virtual machine test platform 150 may periodically run network tests associated with virtual machines to determine if they are functioning properly. For example, network test result signals (e.g., "pass" or "fail") may be received by the virtual machine test platform 150 hourly, on a daily basis, etc.

According to some embodiments, the virtual machine test platform 150 may generate reports 160, such as a troubleshooting report that may be used by an enterprise to investigate problems. FIG. 2 illustrates 200 test results signals associated with the system 100 of FIG. 1. In particular, network test result signals are periodically received over time in connection with virtual machines with p (lower case) indicating "pass" and f (lower case) indicating "fail." Note that different types of network tests result signals may exhibit different properties. For example, a test result signal 210 associated with virtual machine A in FIG. 2 might be associated with a consistent failure (e.g., a wrong version of software is installed) and is typically represented as f. In contrast, a test result signal 220 associated with virtual machine B in FIG. 2 might be associated with an intermittent failure (e.g., a difficult to reproduce stack hardware problem) and will only occasionally be represented by f. Due partly to the substantial number of computing nodes 110 and virtual machines that may be included within a large-scale system, detecting anomalies within various nodes 110 and virtual machines can be a time-consuming and costly process. For example, a snapshot-in-time report 230 at time $T_{FAIL}$ might include thousands of virtual machines and it can be difficult to prioritize which f signals to investigate.

At the present time, data-center administrators are limited to an individualized process that employs manual efforts directed toward reviewing hardware and software issues individually on each node 110 and virtual machine in a piecemeal fashion. Moreover, the system 100 may represent a dynamic platform that is constantly evolving as it operates. For example, there may be large number of nodes 110 running various combinations of component programs. As such, the configuration of these nodes can vary for each component-program combination. Further, the configurations may be progressively updated as new services and/or features are added to virtual machines and/or node hardware is replaced.

Uncorrected software and/or hardware errors, or other anomalies, within the nodes 110 and virtual machines may adversely affect the functionality offered to component programs (e.g., tenants) of a customer's service application residing on the nodes 110. What is needed is a system to accurately and efficiently detect consistent network test result signal problems.

BRIEF DESCRIPTION OF THE DRAWINGS

FIG. 10 is tabular portion of a virtual machine database in accordance with some embodiments.

DETAILED DESCRIPTION

The following description is provided to enable any person in the art to make and use the described embodiments. Various modifications, however, will remain readily apparent to those in the art.

Figure 1:
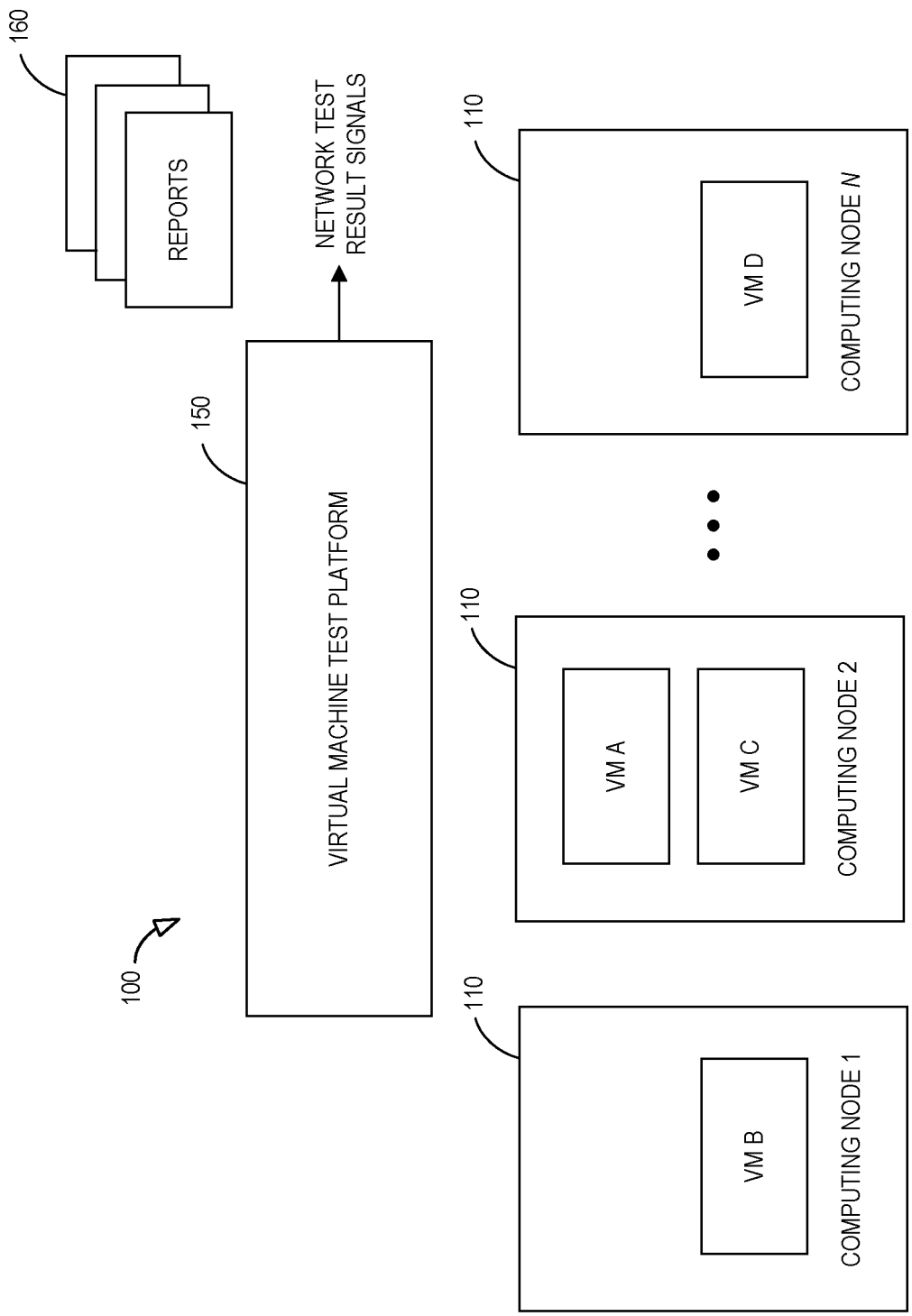
FIG. 1 is a high-level block diagram of a system associated with a data center cloud computing environment.
Figure 2:
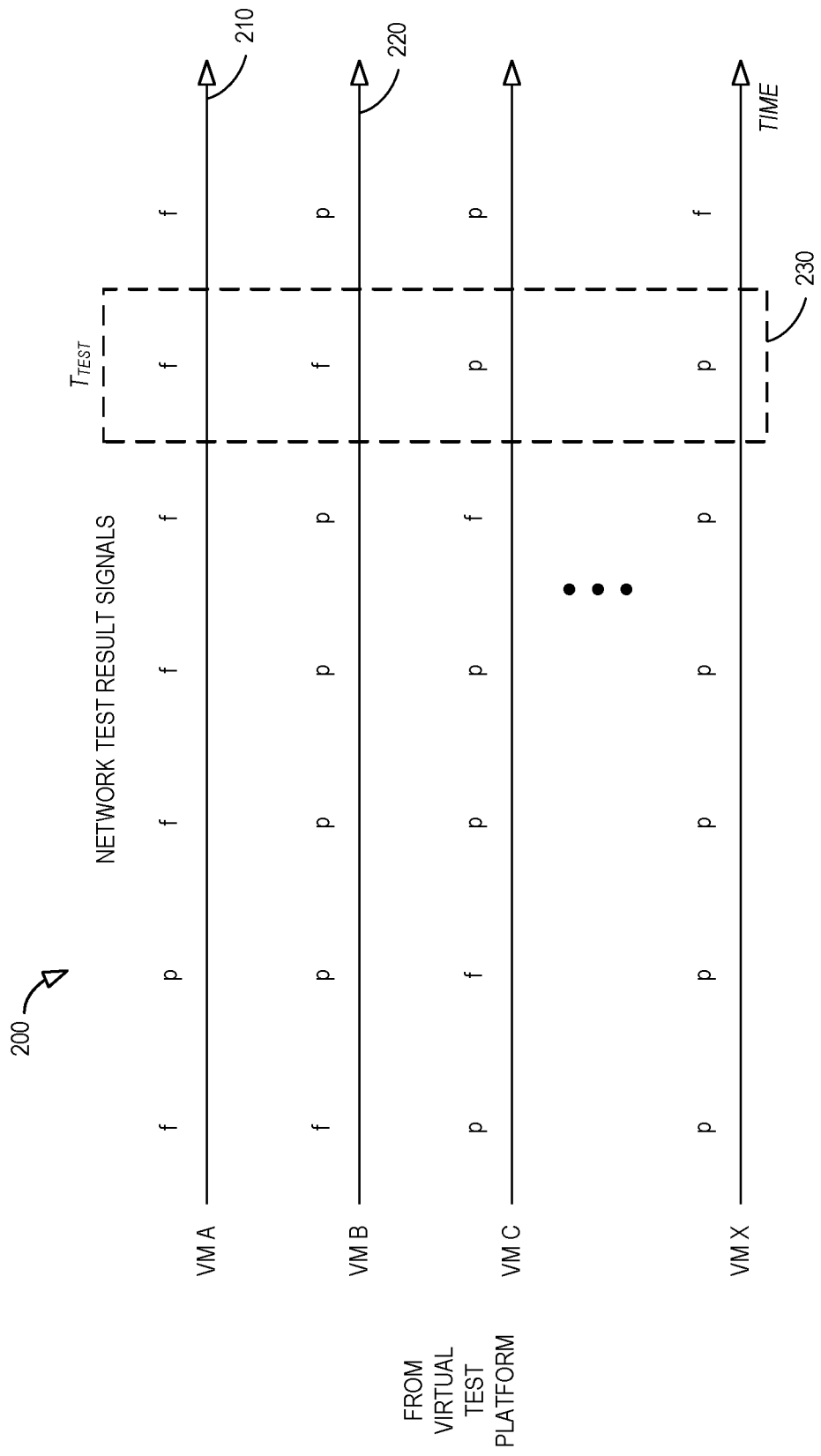
FIG. 2 illustrates test results signals associated with the system of FIG. 1.
Figure 3:
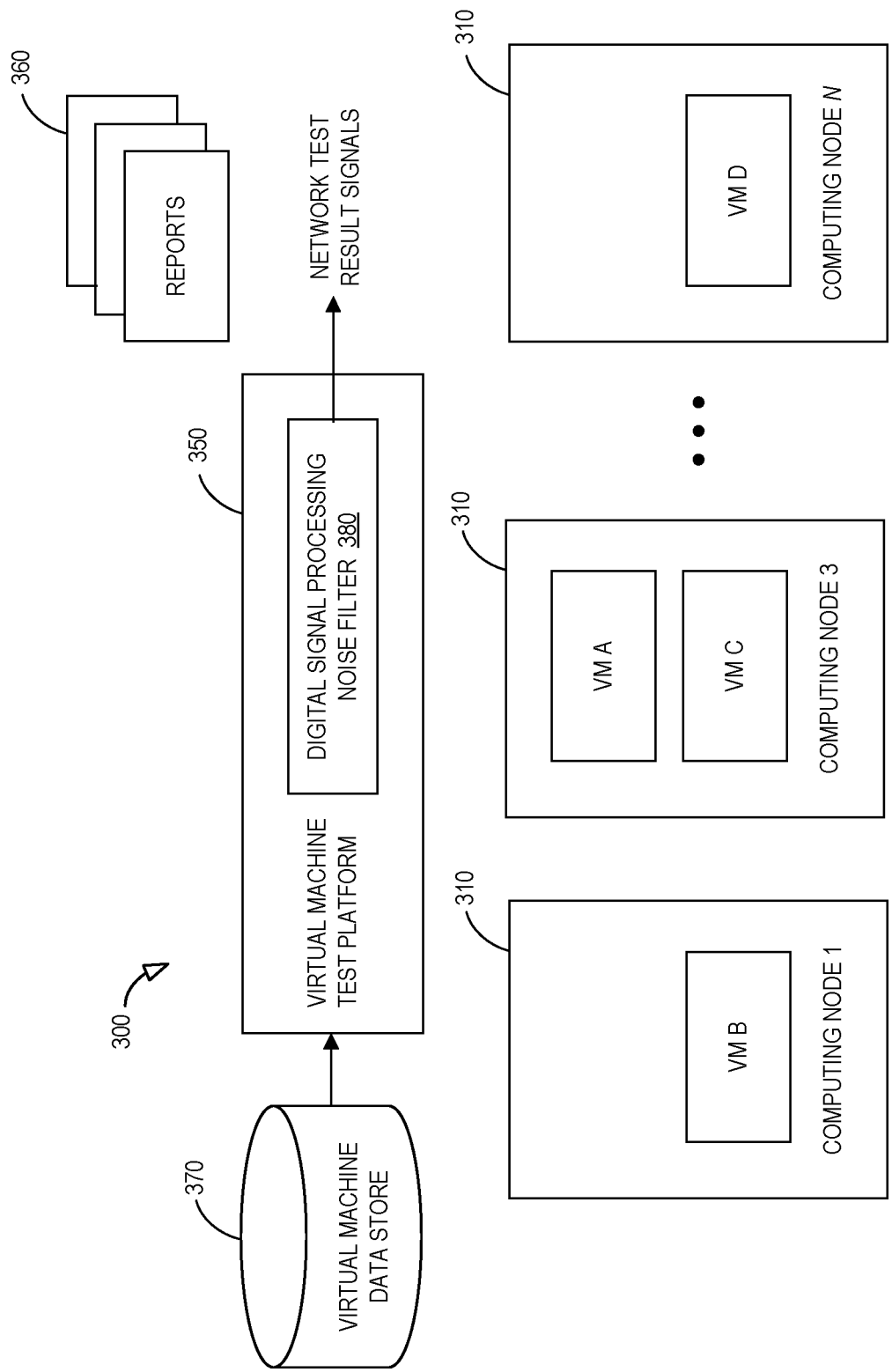
FIG. 3 is a high-level block diagram of a system associated with a data center cloud computing environment.

Generally, some embodiments provide systems and methods to accurately and efficiently detect consistent network test result signal problems. For example, FIG. 3 is a high-level architecture of a system 300 in accordance with some embodiments. The system 300 may include a number of computing nodes 310 (nodes 1 through N). Each computing node 310 may execute one or more virtual machines, such as virtual machines A through D illustrated in FIG. 3. A virtual machine test platform 150 may periodically run network tests associated with virtual machines to determine if they are functioning properly. For example, network test result signals (e.g., "pass" or "fail") may be received by the virtual machine test platform 150.

According to some embodiments, a virtual machine data store 370 may store information about the virtual machines in the system 300, such as which types of network tests should be executed for each virtual machine, prior network test result signals, etc. Moreover, a Digital Signal Processing ("DSP") noise filter 380 may be applied to network test result signals.

As used herein, devices, including those associated with the system 300 and any other device described herein, may exchange information via any communication network which may be one or more of a Local Area Network ("LAN"), a Metropolitan Area Network ("MAN"), a Wide Area Network ("WAN"), a proprietary network, a Public Switched Telephone Network ("PSTN"), a Wireless Application Protocol ("WAP") network, a Bluetooth network, a wireless LAN network, and/or an Internet Protocol ("IP") network such as the Internet, an intranet, or an extranet. Note that any devices described herein may communicate via one or more such communication networks.

The virtual machine test platform 350 may store information into and/or retrieve information from various data sources, such as the virtual machine data store 370. The various data sources may be locally stored or reside remote from the virtual machine test platform 350. Although a single virtual machine test platform 350 is shown in FIG. 3, any number of such devices may be included. Moreover, various devices described herein might be combined according to embodiments of the present invention. For example, in some embodiments, the digital signal processing noise filter 380, virtual machine test platform 350, and virtual machine data store 370 might comprise a single apparatus. The digital signal processing noise filter 380 and/or virtual machine test platform 350 functions may be performed by a constellation of networked apparatuses in a distributed processing or cloud-based architecture.

A user may access the system 300 via remote monitoring devices (e.g., a Personal Computer ("PC"), tablet, smartphone, or remotely through a remote gateway connection to view information about and/or manage data center operation in accordance with any of the embodiments described herein. In some cases, an interactive graphical display interface may let a user define and/or adjust certain parameters (e.g., virtual machine assignments), such as those included in reports 360, and/or provide or receive automatically generated recommendations or results from the virtual machine test platform 350.

Figure 4:
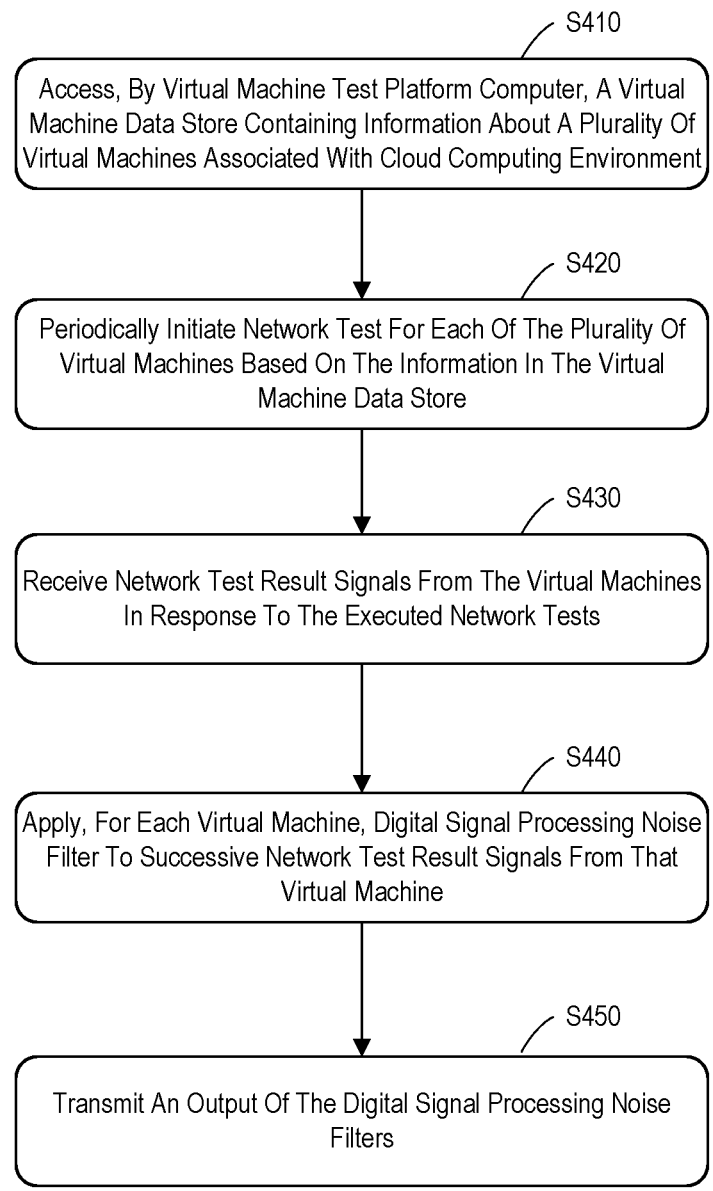
FIG. 4 is a flow diagram of a process in accordance with some embodiments.

FIG. 4 is a flow diagram of a process to detect consistent network test result signal problems in accordance with some embodiments. Note that the flowcharts described herein do not imply a fixed order to the steps, and embodiments of the present invention may be practiced in any order that is practicable. Note that any of the methods described herein may be performed by hardware, software, or any combination of these approaches. For example, a computer-readable storage medium may store thereon instructions that when executed by a machine result in performance according to any of the embodiments described herein.

At S410, a virtual machine test platform computer may access a virtual machine data store containing information about the plurality of virtual machines associated with the cloud computing environment. Note that embodiments described herein might be associated with, for example, a Continuous Integration ("CI") environment, a Continuous Delivery ("CD") environment. etc. At S420, a network test may be periodically initiated for each of the plurality of virtual machines based on the information in the virtual machine data store. At S430, network test result signals may be received from the virtual machines in response to the executed network tests.

At S440, the system may apply, for each virtual machine, a digital signal processing noise filter to successive network test result signals from that virtual machine. The digital signal processing noise filter might, for example, discriminate between chronic failures and intermittent failures within a stack of the cloud computing environment. According to some embodiments, the digital signal noise filter is associated with a library call having the following inputs:
test name,
test type, and
success or failure of the test.
In such a system, the digital signal noise filter might use a storage table to hold state tracking for each unique test entry, with each test entry having a combination of the test name and the test type as a key.

According to some embodiments, the digital signal noise filter determines if a pre-determined consecutive number of network test failures have occurred for a virtual machine. For example, in a "three strikes" implementation, a failure might only be report if it consistently occurs in three consecutive network test result signals. Other embodiments might be associated with, for example, a Finite Impulse Response ("FIR") noise filter (described with respect to FIG. 7) and/or an Infinite Impulse Response ("IIR") noise filter (described with respect to FIG. 8). Note that different types of digital signal noise processing filters might be applied to different virtual machines.

At S450, an output of the digital signal processing noise filters may be transmitted (e.g., to be included in a report). Note that the output of the digital signal processing noise filter might be associated with, for example, a software error, test failure, a regional data center regression, etc. According to some embodiments, the transmitted output of the digital signal processing noise filters is used to generate a report associated with manual investigate by an enterprise associated with the data center cloud computing environment.

Figure 5:
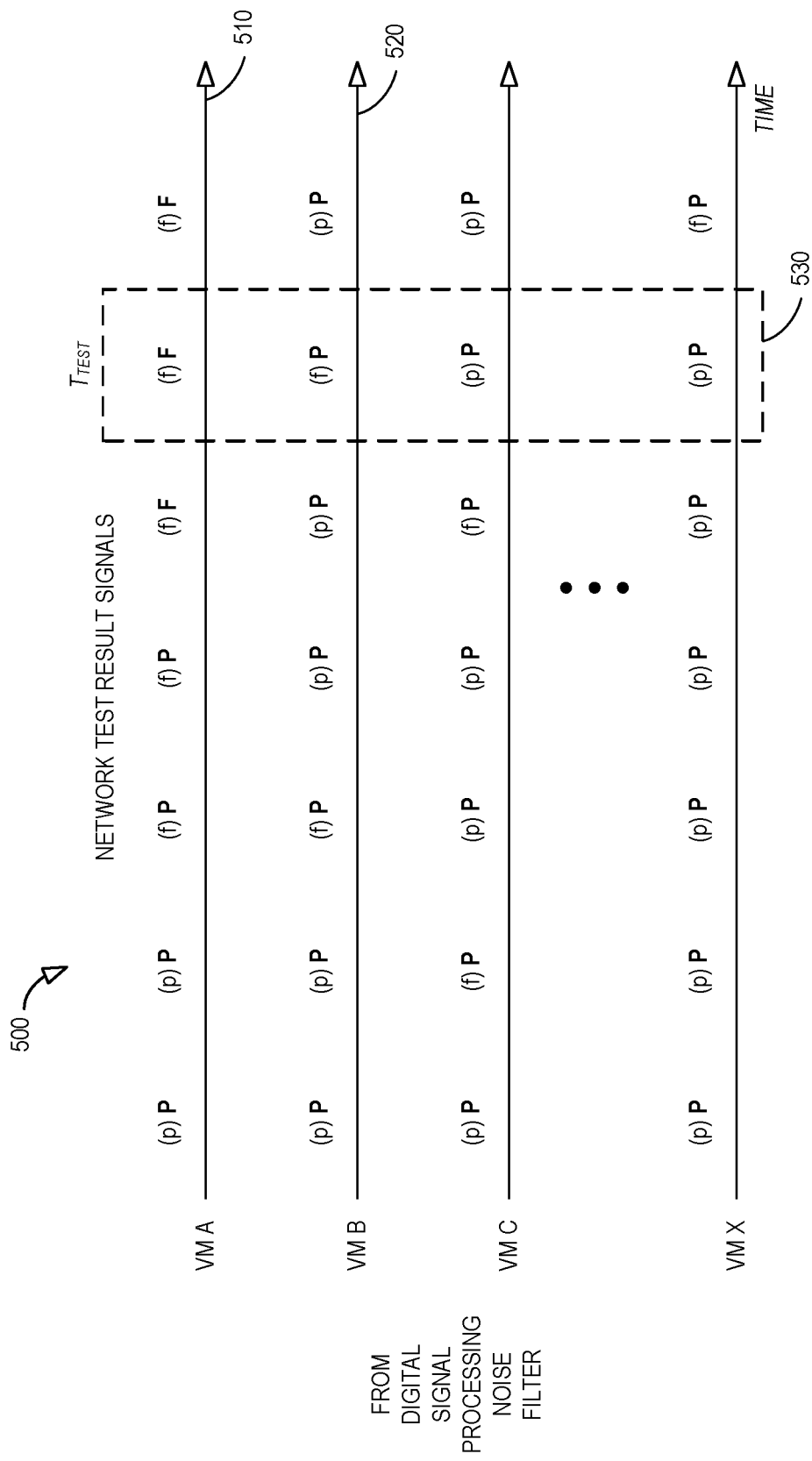
FIG. 5 illustrates test results signals associated with the system of FIG. 3 according to some embodiments.

FIG. 5 illustrates 500 test results signals associated with the system of FIG. 3 according to some embodiments. In particular, network test result signals are periodically received over time in connection with virtual machines with p (lower case and in parenthesis) indicating "pass" and f (lower case and in parenthesis) indicating "fail." As before, different types of network tests result signals may exhibit different properties. For example, a test result signal 510 associated with virtual machine A in FIG. 5 might be associated with a consistent failure (e.g., a wrong version of software is installed) and is typically represented as f. In contrast, a test result signal 520 associated with virtual machine B in FIG. 5 might be associated with an intermittent failure (e.g., a difficult to reproduce stack hardware problem) and will only occasionally be represented by f.

The output of a digital signal processing noise filter is reflected in FIG. 5 as either P (uppercase and bold indicating "pass") or F (uppercase bold indicating "fail"). In particular, the digital signal processing noise filter implements a "three strikes" approach such that a F is reported only when a network test result signal fails three times in a row. For example, the output of the digital processing noise filter for virtual machine A (associated with a consistent failure) at time $T_{FAIL}$ is F (because the three prior results were f and the current network test result signal is f). In contrast, the output of the digital processing noise filter for virtual machine B (associated with an intermittent failure) at time $T_{FAIL}$ is P even though the current network test result signal is f (because the prior result was p). Consequently, a snapshot-in-time report 530 at time $T_{FAIL}$ (that might include thousands of virtual machines) might make it easier to prioritize which f signals to investigate. For example, an enterprise might investigate virtual machine A (which has a consistent failure that should be relatively easy to identify) and not virtual machine B (which has an intermittent failure that might be relatively hard to reproduce and/or identify).

Figure 6:
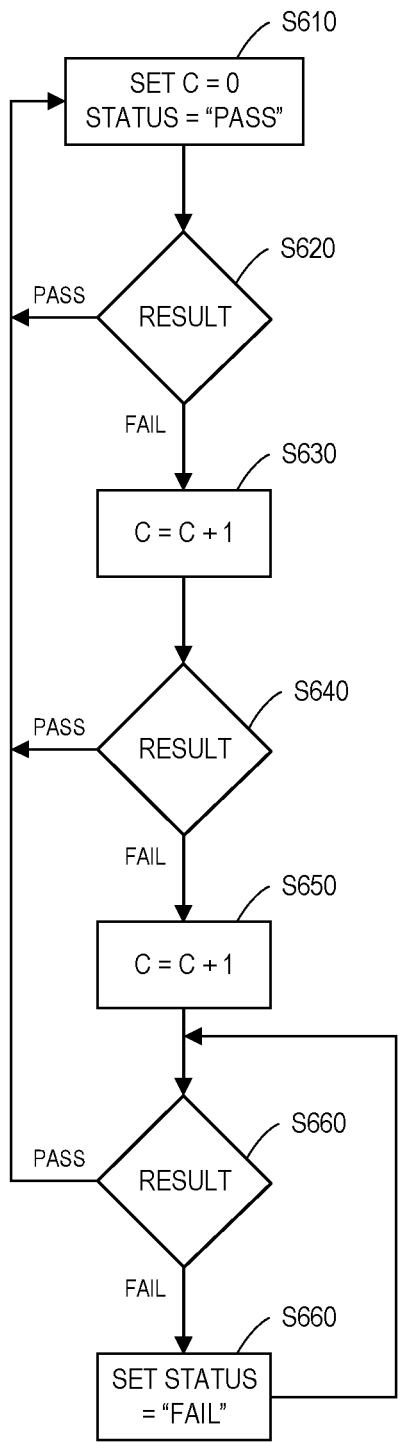
FIG. 6 is a digital signal processing "three strikes" method in accordance with some embodiments.

FIG. 6 is a digital signal processing "three strikes" method in accordance with some embodiments. At S610, a counter C is set to zero and a test status is set to "pass." If a network test result signal is "pass" at S620, the process continues at S610. If a network test result signal is "fail" at S620, the counter C is increased from zero to one at S630 (and there is now one consecutive failure or strike for that virtual machine). If the next network test result signal is "pass" at S640, the process continues at S610 (and the parameters are reset). If the next network test result signal is "fail" at S640, the counter C is increased from one to two at S650 (and there are now two consecutive failures or strikes for that virtual machine). If the next network test result signal is "pass" at S660, the process continues at S610 (and the parameters are reset). If the next network test result signal is "fail" at S660, the status is set to "fail" at S660 and the process continues at S660. As a result, the status will remain "fail" until a network test result signal of "pass" is received (at which point the parameters will be reset).

In this way, embodiments may filter out intermittent failures. Note that in complex global distributed systems, it may be very difficult to correctly discern test failures from unrelated intermittent system failures within the stack. Embodiments described herein use one or more digital signal processing noise filters to help ensure that there is a reliable signal in the event of a software bug, test failure, regional data center regression, etc. The noise filter may be targeted towards known chronic failures or target all failures.

The noise filter may be implemented as a library call named PromoteToFailure that takes the following input arguments: (1) Test Name; (2) Test Type; and (3) Success or Failure of the Test. The library call might return "true" if the test should be promoted to failure, or "false" if the test should be considered a success, thereby filtering out intermittent failures. According to some embodiments, the library call may use storage tables to hold state for tracking each unique test entry, and the key to the entry may be based on a combination of the Test Name and the Test Type. As previously described, a noise filter might be implemented such that "three strikes" in a row means failure or might use more complex algorithms such as IIR or FIR filters. PromoteToFailure may increment the failure count upon failure, or reset to 0 if success. Upon three continuous failures, over three separate CI/CD runs, the system may mark the test as a true failure. In this way, embodiments may use the noise filter to crisply identify bugs, test failures, regional regressions, etc. and filter out all remaining chronic intermittent failures within lower layers of the stack.

Figure 7:
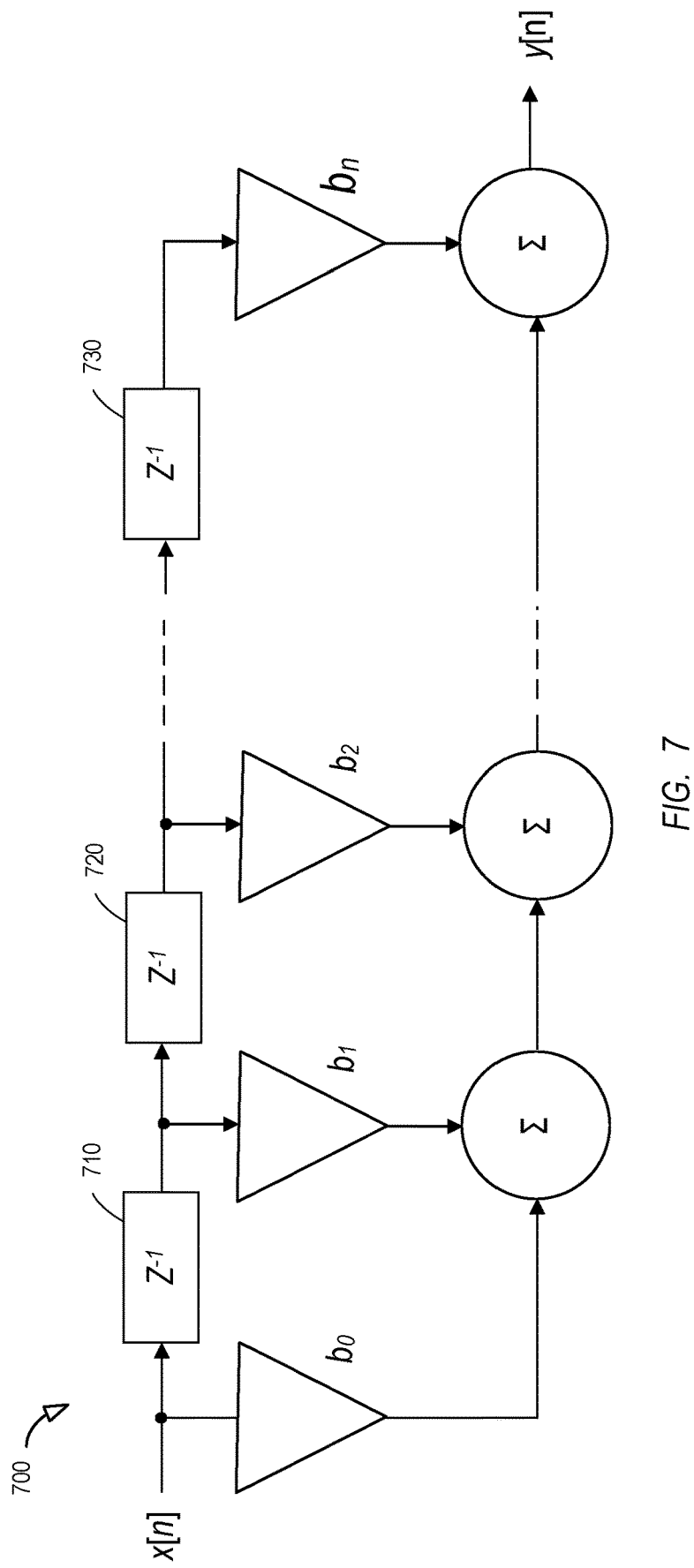
FIG. 7 illustrates finite impulse response digital signal processing according to some embodiments.

FIG. 7 illustrates FIR digital signal processing 700 according to some embodiments. As used herein, the phrase "FIR noise filter for network test result signals" may refer to a filter whose impulse response (or response to any finite length input) is of finite duration and settles to zero in finite time. This is in contrast to IIR filters (which may have internal feedback and may continue to respond indefinitely). The impulse response (that is, the output in response to a Kronecker delta input) of an Nth-order discrete-time FIR filter lasts for N+1 samples (from first nonzero element through last nonzero element) before settling to zero. The system 700 of FIG. 7 is a direct form discrete-time FIR filter of order N. The upper portion 710, 720, 720 is an N-stage delay line with N+1 taps and each unit delay is a $Z^{-1}$ operator in Z-transform notation.

For a causal discrete-time FIR filter of order N, each value of the output sequence is a weighted sum of the most recent input values:

$$y[n] = b_0 x[n] + b_1 x[n-1] + \ldots + b_N x[n-N] = \sum_{i=0}^{N} b_i \cdot x[n-i]$$

where:
x[n] is the input signal;
y[n] is the output signal;
N is the filter order (such that an Nth-order filter has (N+1) terms on the right-hand side of the equation; and
$B_i$ is the value of the impulse response at the ith instant for $0 \le i \le N$ of an Nth-order FIR filter.

Figure 8:
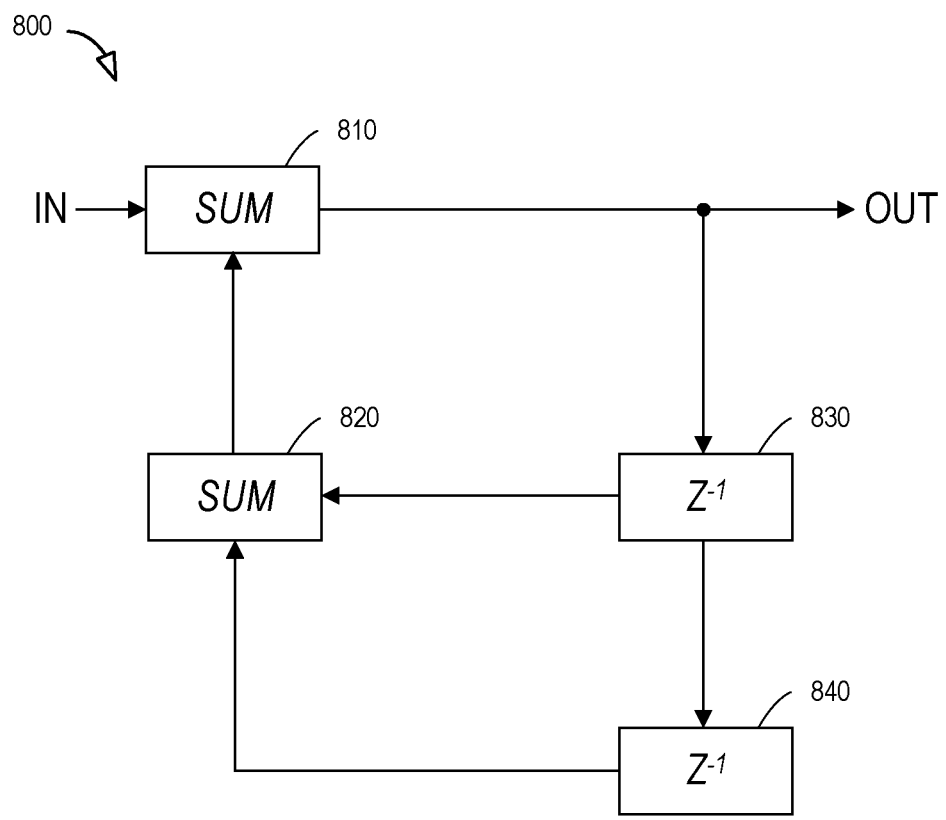
FIG. 8 illustrates infinite impulse response digital signal processing in accordance with some embodiments.

Instead of a FIR noise filter, some embodiments might apply an IIR filter to a network test result signal. For example, FIG. 8 illustrates IIR digital signal processing 800 in accordance with some embodiments. As used herein, the phrase "IIR noise filter for network test result signals" may refer to a filter having an impulse response that does not become exactly zero past a certain point, but instead continues indefinitely. This is in contrast to a FIR filter where an impulse response h(t) does become exactly zero at times t>T for some finite T (thus being of finite duration). The example of FIG. 8, including two sum blocks 810, 820 and two $Z^{-1}$ unit delay blocks 830, 840 may be represented as follows:

$$y[n] = \frac{1}{a_0}(b_0 x[n] + b_1 x[n-1] + \ldots + b_P x[n-P] - a_1 y[n-1] - a_{21} y[n-2] - \ldots - a_Q y[n-Q]$$

where:
P is the feedforward filter order;
$B_i$ are the feedforward filter coefficients;
Q is the feedback filter order;
$A_i$ are the feedback filter coefficients;
x[n] is the input signal; and
y[n] is the output signal.

Figure 9:
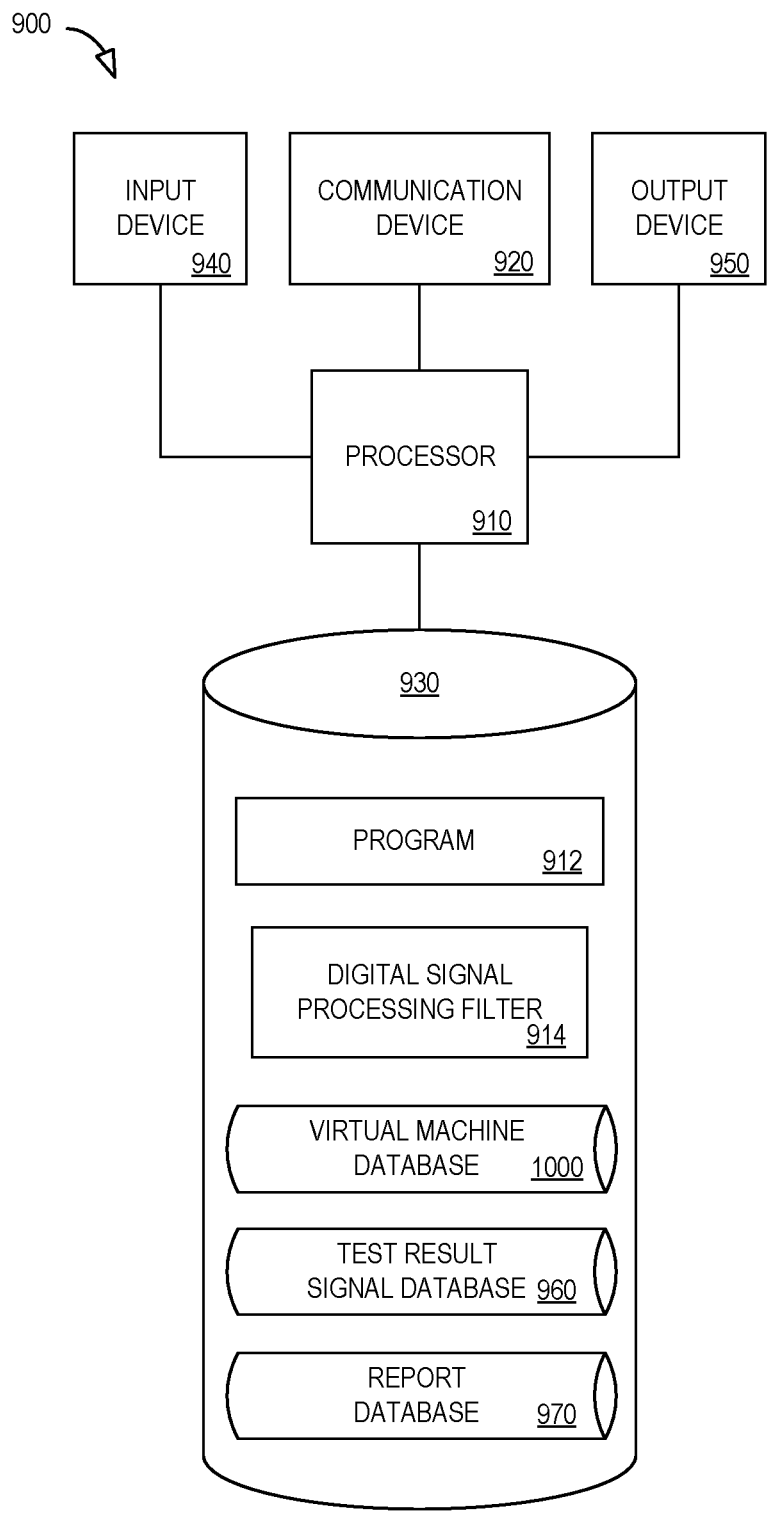
FIG. 9 illustrates a data center management platform according to some embodiments.

The embodiments described herein may be implemented using any number of different hardware configurations. For example, FIG. 9 is a block diagram of a data center management apparatus or platform 900 that may be, for example, associated with the system 300 of FIG. 3 or any other system described herein. The data center management platform 900 comprises a processor 910, such as one or more commercially available Central Processing Units ("CPUs") in the form of one-chip microprocessors, coupled to a communication device 960 configured to communicate via a communication network (not shown in FIG. 9). The communication device 960 may be used to communicate, for example, with one or more remote pressure control units, human access safety doors, etc. The data center management platform 900 further includes an input device 940 (e.g., a computer mouse and/or keyboard to input noise filter or data center information) and/an output device 950 (e.g., a computer monitor to render a display, provide alerts, transmit recommendations, and/or create reports). According to some embodiments, a mobile device, monitoring physical system, and/or PC may be used by an operator to exchange information with the data center management platform 900.

The processor 910 also communicates with a storage device 930. The storage device 930 may comprise any appropriate information storage device, including combinations of magnetic storage devices (e.g., a hard disk drive), optical storage devices, mobile telephones, and/or semiconductor memory devices. The storage device 930 stores a program 916 and/or a digital signal processing filter 914 for controlling the processor 910. The processor 910 performs instructions of the programs 916, 914, and thereby operates in accordance with any of the embodiments described herein. For example, the processor 910 may access a virtual machine data store containing information about a plurality of virtual machines associated with a cloud computing environment. The processor 910 may also periodically initiate a network test for each of the plurality of virtual machines based on the information in the virtual machine data store. The processor 910 may then receive network test result signals from the virtual machines in response to the executed network tests and apply, for each virtual machine, a digital signal processing noise filter to successive network test result signals from that virtual machine. An output of the digital signal processing noise filters may then be transmitted by the processor.

The programs 916, 914 may be stored in a compressed, uncompiled and/or encrypted format. The programs 916, 914 may furthermore include other program elements, such as an operating system, clipboard application, a database management system, and/or device drivers used by the processor 910 to interface with peripheral devices.

As used herein, information may be "received" by or "transmitted" to, for example: (i) the data center management platform 900 from another device; or (ii) a software application or module within the data center management platform 900 from another software application, module, or any other source.

In some embodiments (such as the one shown in FIG. 9), the storage device 930 further stores a virtual machine database 914, a test result signal database 960, and a report database. An example of a database that might be used in connection with the data center management platform 900 will now be described in detail with respect to FIG. 10. Note that the database described herein is only an example, and additional and/or different information may be stored therein. Moreover, various databases might be split or combined in accordance with any of the embodiments described herein.

Referring to FIG. 10, a table is shown that represents the virtual machine database 1000 that may be stored at the data center management platform 900 according to some embodiments. The table may include, for example, entries identifying past and current network test result signals associated with various virtual machines. The table may also define fields 1002, 1004, 1006, 1008, 1010 for each of the entries. The fields 1002, 1004, 1006, 1008, 1010 may, according to some embodiments, specify: a virtual machine identifier 1002, the last three test result signals 1104, a digital signal processing type 1006, a digital signal processing output 1008, and an indication of whether or not the virtual machine should be included in a troubleshooting report 1010. The virtual machine database 1000 may be created and/or updated, for example, whenever data center information changes (e.g., when components and/or virtual machines are added to or removed from a data center) and/or network test result signals are periodically receive as network tests are performed for the datacenter.

The virtual machine identifier 1002 might be a unique alphanumeric code associated with a particular virtual machine and/or computing node. The last three test result signals 1104 might indicate whether that particular virtual machine passed or failed the last three network test (including a current test result signal). The digital signal processing type 1006 might indicate what type of noise filter should be applied for that particular virtual machine or type of network test. The digital signal processing output 1008 represents the current output of the noise filter, and the indication of whether or not the virtual machine should be included in a troubleshooting report 1010 may be based at least in part on the digital signal processing output 1008. Note that virtual machine "VM_1001" is experiencing an intermittent failure and, as a result of applying a three strikes noise filter, will not be included in the troubleshooting report even though the current (e.g., most recent) test result signal for that machine is ("fail"). In contrast, virtual machine "VM_1002" is experiencing consistent failure and, even though a three strikes noise filter is being applied, will be included in the troubleshooting report.

Figure 11:
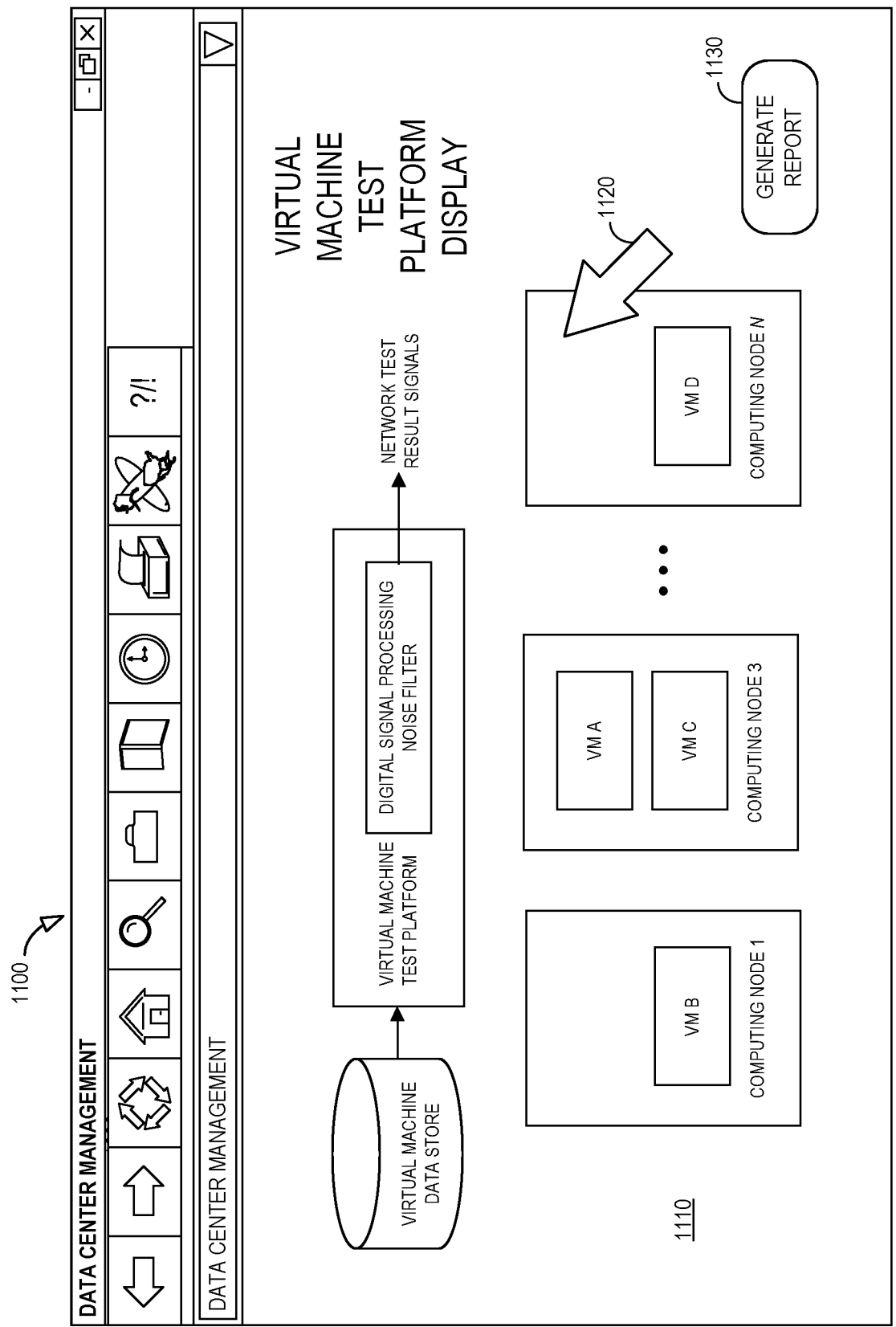
FIG. 11 is an example of a data center management display according to some embodiments.

An operator might manage and/or monitor the performance of data center virtual machines and/or computing nodes. For example, FIG. 11 is an example of a data center management display 1100 according to some embodiments. The display 1100 includes graphical depictions 1110 of elements of a data center (including nodes, virtual machines, etc.). According to some embodiments, selection of an element via a touchscreen or computer mouse pointer 1120 may result in additional information being provided about that element (e.g., in a pop-up window) and/or let an operator adjust parameters for that element (e.g., by changing digital signal processing noise filter parameters, coefficients, etc.). Moreover, in some embodiments, selection of a "Generate Report" icon 1130 may let an operator create a troubleshoot report to investigate consistent failures.

Thus, embodiments may provide systems and methods to accurately and efficiently detect consistent network test result signal problems. Moreover, an enterprise may more readily identify anomalies that are likely associated with software bugs, test failures, regional data center regression, etc. As a result, such problems can be more efficient investigated and resolved, improving the performance of the data center.

The foregoing diagrams represent logical architectures for describing processes according to some embodiments, and actual implementations may include more or different components arranged in other manners. Other topologies may be used in conjunction with other embodiments. Moreover, each component or device described herein may be implemented by any number of devices in communication via any number of other public and/or private networks. Two or more of such computing devices may be located remote from one another and may communicate with one another via any known manner of network(s) and/or a dedicated connection. Each component or device may comprise any number of hardware and/or software elements suitable to provide the functions described herein as well as any other functions.

Some embodiments described herein "filter out" intermittent or inconsistent network test result signal failures. Such failures may be associated with problems deep in the data center stack and can be difficult to resolve. According to some embodiments, the failures that have been filtered out might be automatically analyzed using machine learning techniques to potentially identify patterns, look for root causes of a failure, make recommendations to replace components, etc. As used here, the phrase "machine learning" may refer to any approach that uses statistical techniques to give computer systems the ability to learn (i.e., progressively improve performance of a specific task) with data without being explicitly programmed. Examples of machine learning may include decision tree learning, association rule learning, artificial neural networks deep learning, inductive logic programming, Support Vector Machines ("SVM"), clustering, Bayesian networks, reinforcement learning, representation learning, similarity and metric learning, sparse dictionary learning, genetic algorithms, rule-based machine learning, learning classifier systems, etc.

Embodiments described herein are solely for the purpose of illustration. Those in the art will recognize other embodiments may be practiced with modifications and alterations to that described above.

What is claimed is:

1. A system associated with a data center cloud computing environment executing a plurality of virtual machines, comprising:
   a virtual machine data store containing information about the plurality of virtual machines associated with the cloud computing environment; and
   a virtual machine test platform, coupled to the virtual machine data store, to:
      initiate network tests for a virtual machine based on the information in the virtual machine data store,
      receive network test result signals from the virtual machine in response to the executed network tests,
      apply a digital signal processing noise filter to successive network test result signals from the virtual machine to determine whether successive network tests of the virtual machine failed, and
      transmit an output comprising a first value indicating whether a most recent network test of the virtual machine failed and a second value indicating whether the successive network tests of the virtual machine failed.

2. The system of claim 1, wherein the digital signal processing noise filter discriminates between chronic failures and intermittent failures within a stack of the cloud computing environment.

3. The system of claim 1, wherein the output of the digital signal processing noise filter is associated with at least one of: (i) a software error, (ii) test failure, and (iii) a regional data center regression.

4. The system of claim 1, wherein the digital signal noise filter is associated with a library call having the following inputs: (i) test name, (ii) test type, and (iii) success or failure of the test.

5. The system of claim 4, wherein the digital signal noise filter uses a storage table to hold state tracking for each unique test entry, each test entry having a combination of the test name and the test type as a key.

6. The system of claim 1, wherein the digital signal noise filter determines the second value is a failure value when a pre-determined consecutive number of network test failures have occurred for the virtual machine.

7. The system of claim 1, wherein the digital signal noise filter is associated with at least one of: (i) an infinite impulse response noise filter, and (ii) finite impulse response noise filter.

8. The system of claim 1, wherein the virtual machine test platform is associated with at least one of: (i) a continuous integration environment, and (ii) a continuous delivery environment.

9. The system of claim 1, wherein different types of digital signal noise processing filters are applied to different virtual machines from among the plurality of virtual machines.

10. The system of claim 1, wherein the first and second values are included in a report associated with a manual investigation by an enterprise associated with the data center cloud computing environment.

11. A method comprising:
   initiating network tests for a virtual machine based on information in a virtual machine data store;
   receiving network test result signals from the virtual machine in response to the executed network tests;
   applying a digital signal processing noise filter to successive network test result signals from the virtual machine to determine whether successive network tests of the virtual machine failed; and
   transmitting an output comprising a first value indicating whether a most recent network test of the virtual machine failed and a second value indicating whether the successive network tests of the virtual machine failed.

12. The method of claim 11, wherein the digital signal processing noise filter discriminates between chronic failures and intermittent failures within a stack of the cloud computing environment.

13. The method of claim 11, wherein the output of the digital signal processing noise filter is associated with at least one of: (i) a software error, (ii) test failure, and (iii) a regional data center regression.

14. The method of claim 11, wherein the digital signal noise filter is associated with a library call having the following inputs: (i) test name, (ii) test type, and (iii) success or failure of the test.

15. The method of claim 14, wherein the digital signal noise filter uses a storage table to hold state tracking for each unique test entry, each test entry having a combination of the test name and the test type as a key.

16. The method of claim 11, wherein the digital signal noise filter determines the second value is a failure value when a pre-determined consecutive number of network test failures have occurred for the virtual machine.

17. A non-transitory computer-readable medium storing instructions to be executed by a processor to perform a method comprising:
   initiating network tests for a virtual machine based on information in a virtual machine data store;
   receiving network test result signals from the virtual machine in response to the executed network tests;
   applying a digital signal processing noise filter to successive network test result signals from the virtual machine to determine whether successive network tests of the virtual machine failed; and
   transmitting an output comprising a first value indicating whether a most recent network test of the virtual machine failed and a second value indicating whether the successive network tests of the virtual machine failed.

18. The medium of claim 17, wherein the digital signal noise filter is associated with at least one of: (i) an infinite impulse response noise filter, and (ii) finite impulse response noise filter.

19. The medium of claim 17, wherein virtual machine test platform is associated with at least one of: (i) a continuous integration environment, and (ii) a continuous delivery environment.

20. The medium of claim 17, wherein different types of digital signal noise processing filters are applied to different virtual machines.

* * * * *